(12) United States Patent
Appuswamy et al.

(10) Patent No.: US 12,067,472 B2
(45) Date of Patent: Aug. 20, 2024

(54) DEFECT RESISTANT DESIGNS FOR LOCATION-SENSITIVE NEURAL NETWORK PROCESSOR ARRAYS

(71) Applicant: INTERNATIONAL BUSINESS MACHINES CORPORATION, Armonk, NY (US)

(72) Inventors: Rathinakumar Appuswamy, San Jose, CA (US); John V. Arthur, Mountain View, CA (US); Andrew S. Cassidy, San Jose, CA (US); Pallab Datta, San Jose, CA (US); Steven K. Esser, San Jose, CA (US); Myron D. Flickner, San Jose, CA (US); Jennifer Klamo, San Jose, CA (US); Dharmendra S. Modha, San Jose, CA (US); Hartmut Penner, San Jose, CA (US); Jun Sawada, Austin, TX (US); Brian Taba, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1082 days.

(21) Appl. No.: 15/942,298

(22) Filed: Mar. 30, 2018

(65) Prior Publication Data
US 2019/0303741 A1 Oct. 3, 2019

(51) Int. Cl.
*G06N 3/04* (2023.01)
*G06N 3/063* (2023.01)

(52) U.S. Cl.
CPC .............. *G06N 3/04* (2013.01); *G06N 3/063* (2013.01)

(58) Field of Classification Search
CPC ................................ G06N 3/04; G06N 3/063
See application file for complete search history.

(56) References Cited

U.S. PATENT DOCUMENTS 7,549,081 B2 6/2009 Robbins et al.
8,990,616 B2 3/2015 Alvarez-Icaza Rivera et al.
(Continued)

FOREIGN PATENT DOCUMENTS

CN 102609327 B 7/2015

OTHER PUBLICATIONS

Zhang et al. Analyzing and Mitigating the Impact of Permanent Faults on a Systolic Array Based Neural Network Accelerator. IEEE Design & Test 36.5 (2019): 44-53. Available online Feb. 17, 2018. (Year: 2018).*

(Continued)

*Primary Examiner* — Alexey Shmatov
*Assistant Examiner* — Robert Bejcek, II
(74) *Attorney, Agent, or Firm* — Erik A. Huestis; Joshua S. Matloff; Foley Hoag LLP

(57) ABSTRACT

Defect resistant designs for location-sensitive neural network processor arrays are provided. In various embodiments, plurality of neural network processor cores are arrayed in a grid. The grid has a plurality of rows and a plurality of columns. A network interconnects at least those of the plurality of neural network processor cores that are adjacent within the grid. The network is adapted to bypass a defective core of the plurality of neural network processor cores by providing a connection between two non-adjacent rows or columns of the grid, and transparently routing messages between the two non-adjacent rows or columns, past the defective core.

23 Claims, 17 Drawing Sheets

(56) References Cited

U.S. PATENT DOCUMENTS

2011/0302450 A1* 12/2011 Hickey .............. G06F 9/30185
714/17
2016/0323137 A1  11/2016 Alvarez-Icaza Rivera et al.
2017/0003347 A1   1/2017 Benazouz

OTHER PUBLICATIONS

Hollis et al. When Does Network-On-Chip Bypassing Make Sense? 2009 IEEE. (Year: 2009).*
Hollis et al. When Does Network-On-Chip Bypassing Make Sense? 2009 (Year: 2009).*
Wu et al. A Novel Architecture and Routing Algorithm for Dynamic Reconfigurable Network-On-Chip. Ninth IEEE International Symposium on Parallel and Distributed Processing with Applications. 2011. (Year: 2011).*
Fortes, Jose A. B., et al., "Gracefully Degradable Processor Arrays," IEEE Transactions on Computers, 11 (1985): 1033-1044.

* cited by examiner

DEFECT RESISTANT DESIGNS FOR LOCATION-SENSITIVE NEURAL NETWORK PROCESSOR ARRAYS

BACKGROUND

Embodiments of the present disclosure relate to neural network inferencing, and more specifically, to defect resistant designs for location-sensitive neural network processor arrays.

BRIEF SUMMARY

According to embodiments of the present disclosure, neural network processor systems are provided. A plurality of neural network processor cores are arrayed in a grid. The grid has a plurality of rows and a plurality of columns. A network interconnects at least those of the plurality of neural network processor cores that are adjacent within the grid. The network is adapted to bypass a defective core of the plurality of neural network processor cores by providing a connection between two non-adjacent rows or columns of the grid, and transparently routing messages between the two non-adjacent rows or columns, past the defective core.

According to embodiments of the present disclosure, neural network processor systems are provided. A plurality of neural network processor cores is arrayed in a grid. The grid has a plurality of rows and a plurality of columns. A network interconnects at least those of the plurality of neural network processor cores that are adjacent within the grid. The network is adapted to bypass a defective core of the plurality of neural network processor cores by providing a connection between two non-adjacent cores, and transparently routing messages between the two non-adjacent cores, past the defective core.

According to embodiments of the present disclosure, methods of and computer program products for bypassing a defective core of a plurality of neural network processor cores are provided. The cores are arrayed in a grid. The grid has a plurality of rows and a plurality of columns. A network interconnects at least those of the plurality of neural network processor cores that are adjacent within the grid. A connection is provided between two non-adjacent rows or columns of the grid. Messages are transparently routed between the two non-adjacent rows or columns, past the defective core.

According to embodiments of the present disclosure, methods of and computer program products for bypassing a defective core of a plurality of neural network processor cores are provided. The cores are arrayed in a grid. The grid has a plurality of rows and a plurality of columns. A network interconnects at least those of the plurality of neural network processor cores that are adjacent within the grid. A connection is provided between two non-adjacent cores. Messages are transparently routed between the two non-adjacent cores, past the defective core.

DETAILED DESCRIPTION

Figure 1:
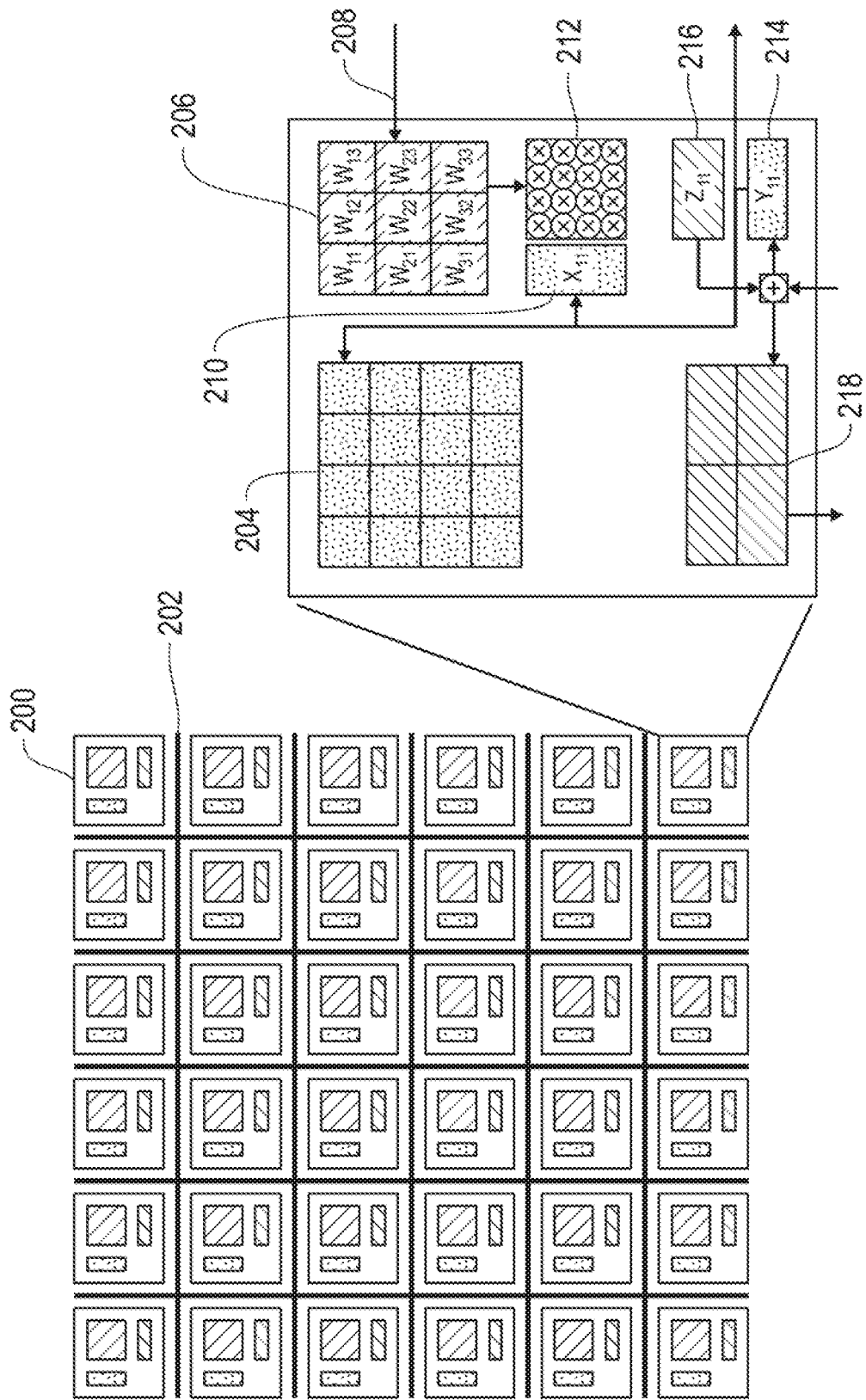
FIG. 1 depicts a plural-neural core inference processor architecture, according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

Arrays of neural processing units, called neural cores, provide an architecture to execute various types of neural networks and deep neural networks. These cores use spikes or neuron activations to encode information. In a network of neural cores, neurons on each core can connect to any axon of any other neural core (including itself). When a neuron activates, it sends a packet that gets delivered to a target axon on a destination core. It will be appreciated that neuron activations may be distributed in various ways, including via an on-chip network. Various examples herein refer to neuron activations transmitted over a network, however, it will be appreciated that the present disclosure applies more generally to any neurosynaptic system with a many-core architecture, including GPUs and specialized ASICs, and to neuron activations irrespective of transport mechanism.

In digital neural systems, information is represented and delivered by spikes or neuron activations. In various embodiments, each spike is a digital packet of information, carrying one or more bits. For example, each spike may carry a single bit of information (a binary spike). Spiking neural networks are based on delivering packets of information over switched communication wires, thereby significantly reducing the required wiring. The presence of a spike is treated as receiving a 1, its absence represents a 0. More values can be coded into binary spikes using several different spike coding schemas. More generally, more values can be encoded using neuron activations with more bits.

A communication from a source core to a destination core would effectively need to traverse certain number of hops via routers in a 2D grid in either the horizontal or vertical or a combination of both to be delivered to the destination core. Each hop a packet traverses, consumes power and energy.

Within certain exemplary neural systems, a fixed amount of time is allowed for a packet to travel from its source core to its destination core. This fixed window is referred to as a tick. The time a packet requires for its journey varies based on the distance the packet must travel and the number of 2-D mesh routing, chip and board interfaces that the packet travels across.

On each tick, the neurons in a core may be processed sequentially, starting with the first neuron and continuing through the last neuron. Accordingly, in addition to the transmission delays discussed above, each packet is also delayed by some additional fixed amount based on which neuron on a core generated it. For example, in an exemplary neural system having 256 neurons per core, the 256th neuron is not processed until the preceding 255 neurons are processed.

In other neural processing cores, a layer of a neural network is represented as a tensor, and the computation of neuron activations is performed as a matrix multiplication on a suitable processor. However, it will be appreciated that the present disclosure is applicable to a variety of computation cores.

According to various embodiments of the present disclosure, a neural program represents a neural network. A neural program includes information relating to the neural network. In some embodiments, the information includes neuronal properties and dynamics that determine an electronic neuron's response to input activations. For example, neuronal properties and dynamics can include a threshold parameter, a leak parameter, a delay parameter, or a reset parameter. In some embodiments, the neural program information includes synaptic connections of the neuron (e.g., synaptic connections made via a synaptic crossbar). In some embodiments, the neural program information includes axon properties (e.g., axon types). In some embodiments, the neural program information includes one or more destinations (e.g., target axons) that the neuron's output activations should be delivered to.

According to various embodiments, a neural network represents an instantiation of a neural program. A neural network may be instantiated in hardware, in simulation or in both. For example, a neural program may give rise to one or more instances of a neural network, wherein the instances may reside on a single core, multiple cores, or multiple chips.

With reference now to FIG. 1, a baseline many-core neural inference processor architecture according to embodiments of the present disclosure is depicted. In aggregate, the plurality of neural inference cores 200 form a Network on Chip (NoC) 202. as shown in the call-out in FIG. 1, each neural inference core 200 includes an activation memory 204, weight memory 206, broadcast bus 208, input activation register 210, massively parallel vector-matrix multiplier 212, output activation register 214 and partial sum scratch pad 216.

In an exemplary implementation, the baseline core behaves according to the following protocol:

1. At initialization, input activations are stored in the core activation memories.
2. Weight values are distributed to each core through Network on Chip (NoC) 202, and stored in the weight memory 206.
3. Activation block X is read from activation memory 204, weight block W is read from weight memory 206, and sent to the vector-matrix multiplier.
4. The vector-matrix multiplier computes vector-matrix product XW and the output Z is stored in the partial sum register 216.
5. The partial sums may be sent to neighboring cores, and then added to other partial vector-matrix multiplication results X'W'=Z'.
6. An activation function is applied to the final partial sum and the result Y is written to the output activation register 214.
7. The output activation Y is written back to the activation memory 204.

In this way, various core configurations provide distributed logic for computation. In various embodiments, multiple distributed neural cores act in parallel. This parallelism enables an increase in the speed of neural network processing while decreasing latency between presentation of input and computation of output. Each neural core implements a part of the larger neural network model for a given problem. Each neural core receives a portion of the overall chip input, and a portion of the overall neural network model. This enables modularity of chips and cores, thereby streamlining system design, debugging, and testing.

It will be understood by one of ordinary skill that the particular core implementation disclosed herein is for purpose of illustration and not limitation, a variety of core implementations can be incorporated within the present disclosure.

Figure 2:
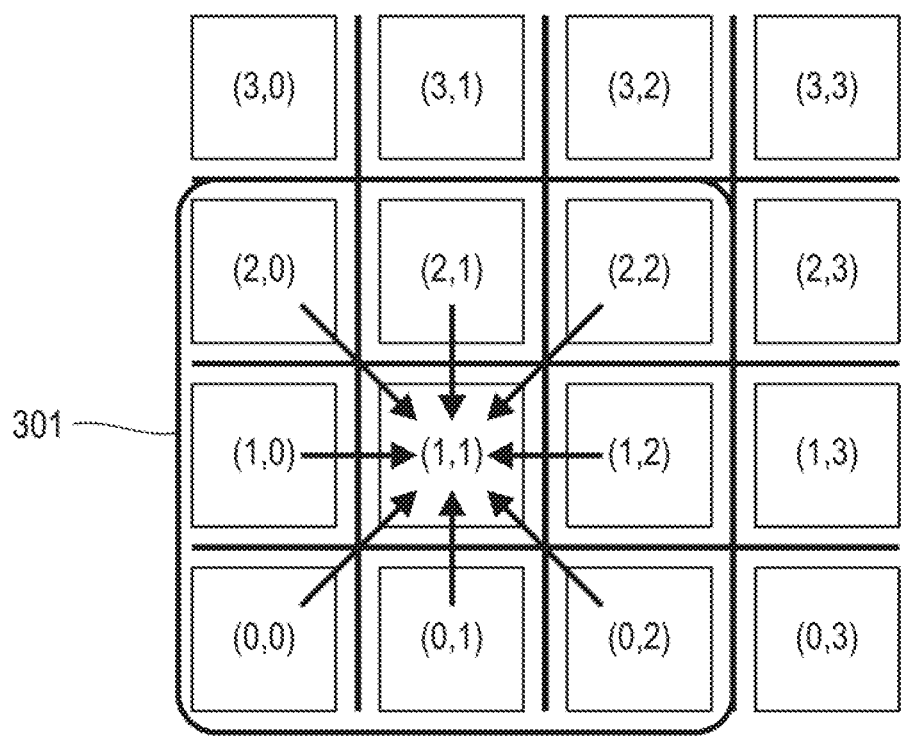
FIG. 2 depicts a location-sensitive core grid, according to embodiments of the present disclosure.

With reference now to FIG. 2, an exemplary location-sensitive core grid is depicted in which the position of the core determines what data is processed in each core. In some embodiments, Core (x,y) holds a picture image pixel at coordinate (x,y). When applying a 3×3 convolution filter, for example, the algorithm can make 3×3 cores in box 301 work together, send a partial sum result at each core to the center core (1,1), and then compute the final result. In some embodiments the core sends partial sum only to select, e.g. neighboring, cores. In such embodiments, the location of each core is critical for the algorithm.

Figure 3:
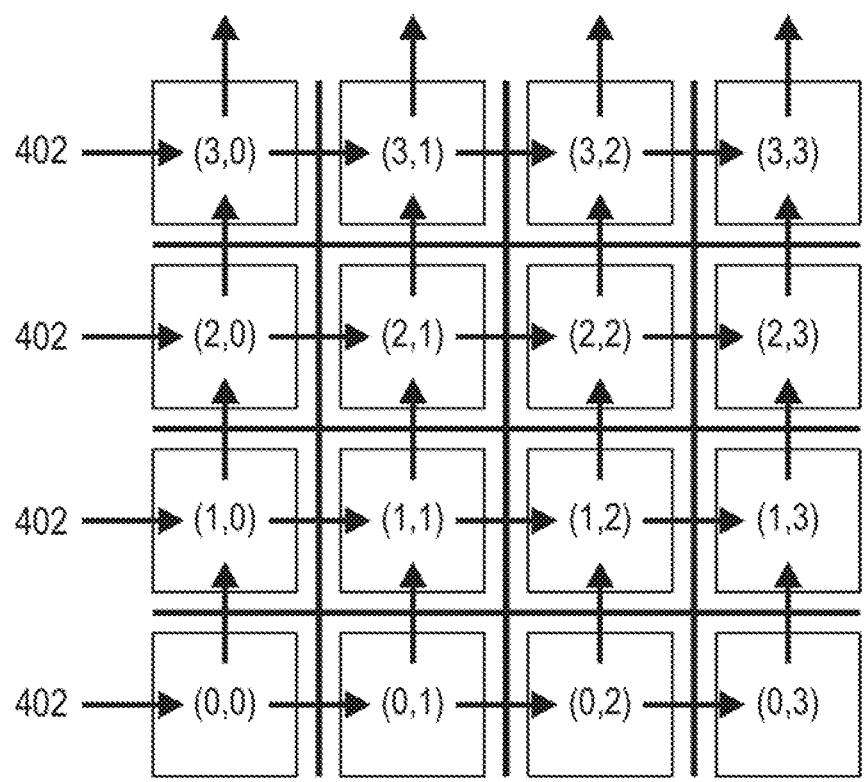
FIG. 3 depicts another example of a location-sensitive core grid, according to embodiments of the present disclosure.

With reference now to FIG. 3, another exemplary location-sensitive core grid is depicted in which neural network processor cores receive input neuron activation 402 from the left side, and the resulting partial sums are passed vertically toward top. Again, the location of the core is restricted and cannot be moved easily, because the location is interrelated to the neighboring cores in that the location of any given core determines which input data it receives, as well as to which core its output is contributed.

Figure 4:
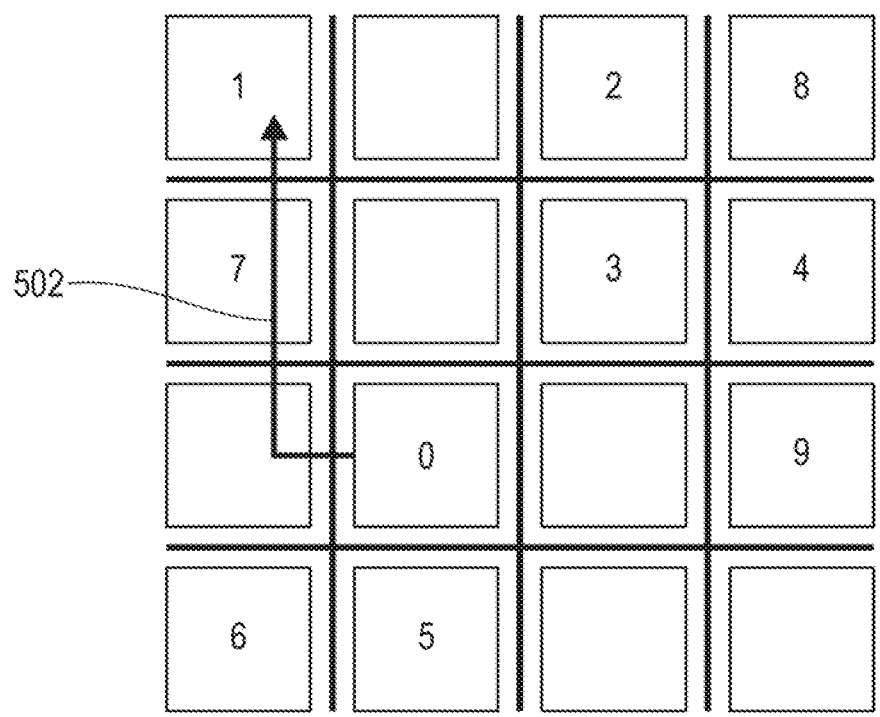
FIG. 4 depicts a location-insensitive neural network processor core array, according to embodiments of the present disclosure.

With reference now to FIG. 4, an exemplary location insensitive neural network processor cores in which a processor may map its logical core to any physical core(s). In some embodiments, core to core communication is controlled by Network-on-chip (NOC) routing unit, thus any given core(s) can communicate with any remaining core(s). For purpose of illustration and not limitation, FIG. 4 depicts a possible placement of 9 cores, 0 to 9. Here, the message 502 from core 0 to core 1 travels on NoC irrespective of where the cores are located. Accordingly, the algorithm works regardless of the placement, therefore the results of the algorithm are identical regardless of the placement. However, performance may vary, e.g. degrade as a function of how remote the cores are placed relative to each other.

Figure 5:
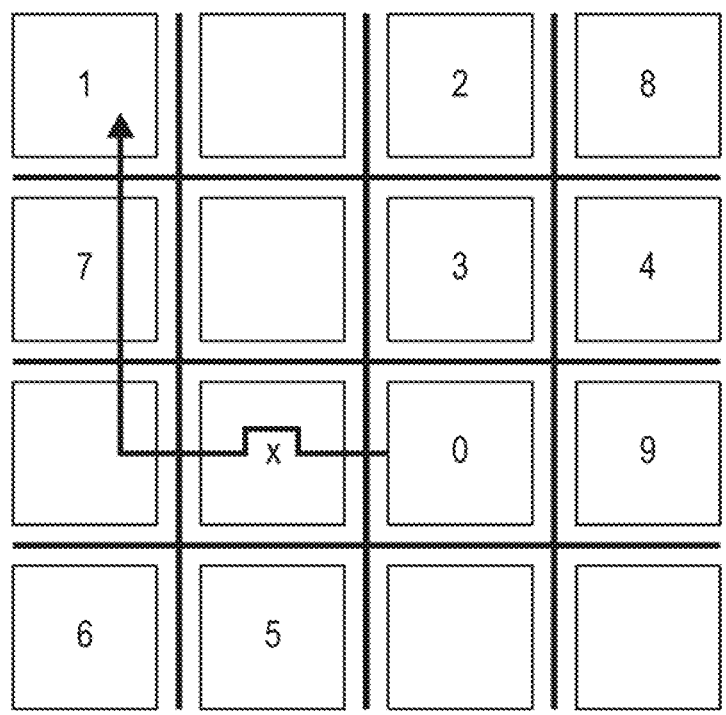
FIG. 5 depicts repair process of a location-insensitive neural network processor core array, according to embodiments of the present disclosure.

FIG. 5, depicts an exemplary repair process of location insensitive neural network processor cores. In the illustrated embodiment, the logical core is relocated to another core. For example, Core 0 in the original location (1,1) was moved to (1,2), as the core is defective. In such processes, the algorithm continues to work without interruption or degradation such that it is analogous to the memory of a computer, i.e., no matter which part of memory the program is physically located, the computer works identically through the virtual memory mechanism.

In accordance with an aspect of the disclosure, for scenarios wherein the neurosynpatic core grid is location-sensitive, the underlying algorithm depends on where cores are physically allocated. If location of a core is moved, the algorithm is broken and does not function properly. Accordingly, the present disclosure provides a novel technique to repair the core grid when one or more cores are defective.

Figure 6:
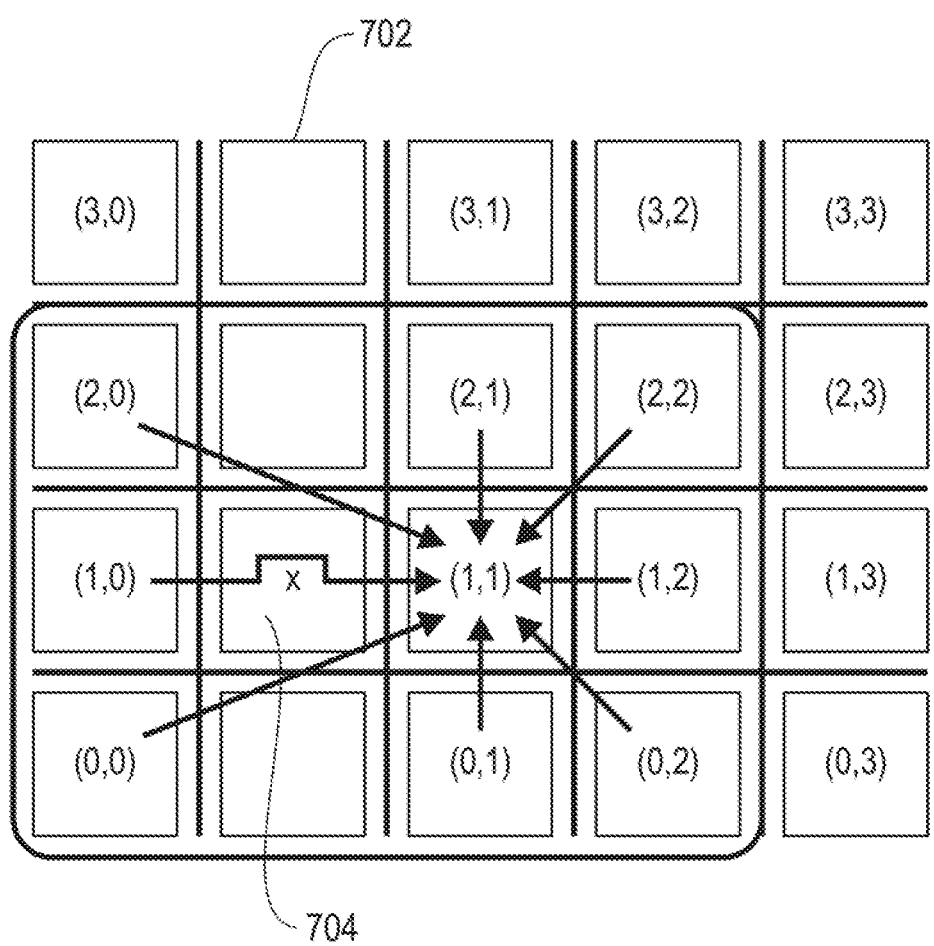
FIG. 6 depicts an operation to restore location-sensitive neural network processor core array, according to embodiments of the present disclosure.

FIG. 6, depicts an exemplary method to restore location-sensitive neural network processor core arrays with defective cores with redundant columns (or rows) of cores. This method is particularly suited for configurations having an extra column or multiple extra columns (or rows) of cores. In some embodiments, when a defective core exists, the entire column 702 (or row) can be skipped. In some embodiments, the only the particular defective core(s) 704 can be skipped. Although particular cores(s) and/or entire columns/rows are skipped, the operation continues without any noticeable interruption so as to provide an illusion of a seamless core grid to the algorithm. In the example illustrated in FIG. 6, because column 702 contains a defective core, this column is skipped. It will be understood by artisans of ordinary skill that the underlying logic is equally applicable for skipping a column(s) or row(s). Additionally, multiple columns (or rows) can be skipped if there are multiple defects residing therein.

Figure 7A:
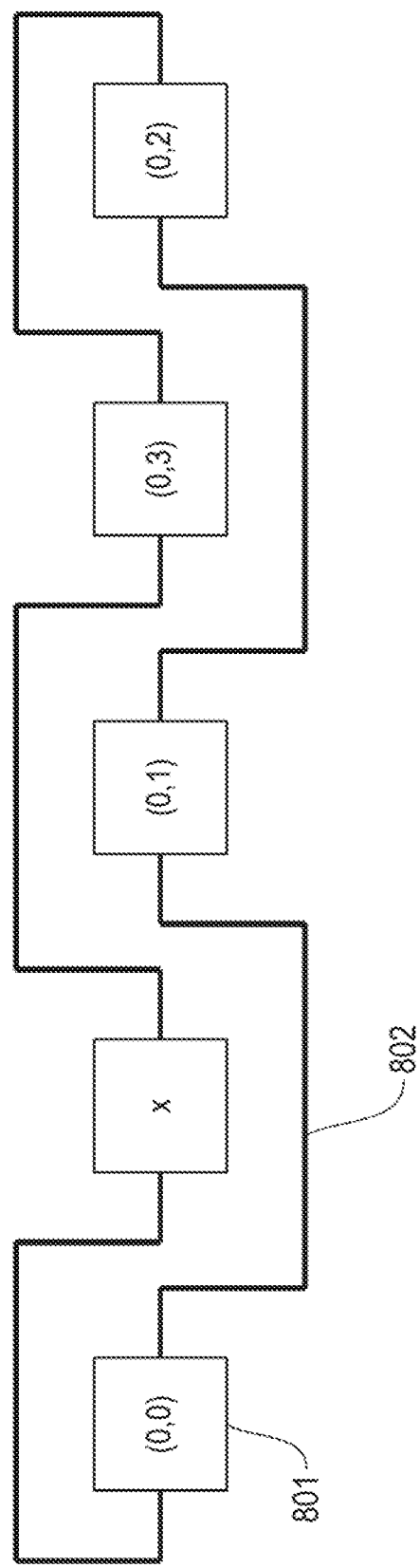
FIG. 7A-B depicts an exemplary torus, according to embodiments of the present disclosure.
Figure 7B:
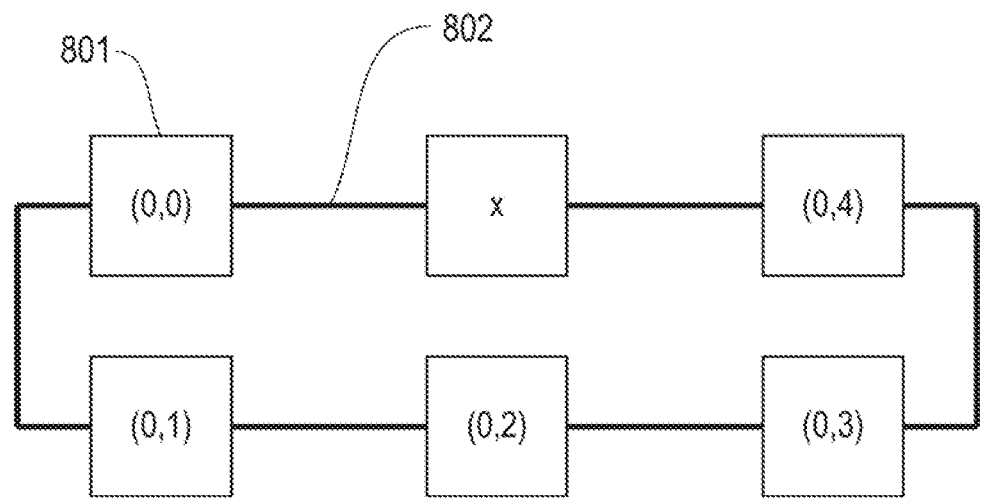

In accordance with another aspect of the disclosure, a torus can be formed in one direction, or a 2-dimensional direction. An exemplary embodiment of which is provided in FIG. 7A, in which a row of cores 801 are connected by wires 802 to form a torus via a configuration wherein a core is connected to the cores one core away from the adjacent core. Additionally or alternatively, a loop configuration can be employed, as shown in FIG. 7B.

Referring back to FIG. 7A, logical cores (0,0) and (0,3) are placed on the physical cores connected to the defective core marked X. In that way, logical cores (0,0), (0,1), (0,2) and (0,3) are connected in that order without a defective core between them. Similarly, in FIG. 7B, logical cores (0,0) and (0,4) are placed on the physical cores next to the defective core marked by X. This provides the remaining cores with contiguous connections. Accordingly, it is possible to skip a column by shifting the entire placements. This approach can also be employed to form a 2-D torus of core grids, which allows for repair of a plurality, e.g. 2, defective cores instead of only a single core, per repair operation.

Figure 8:
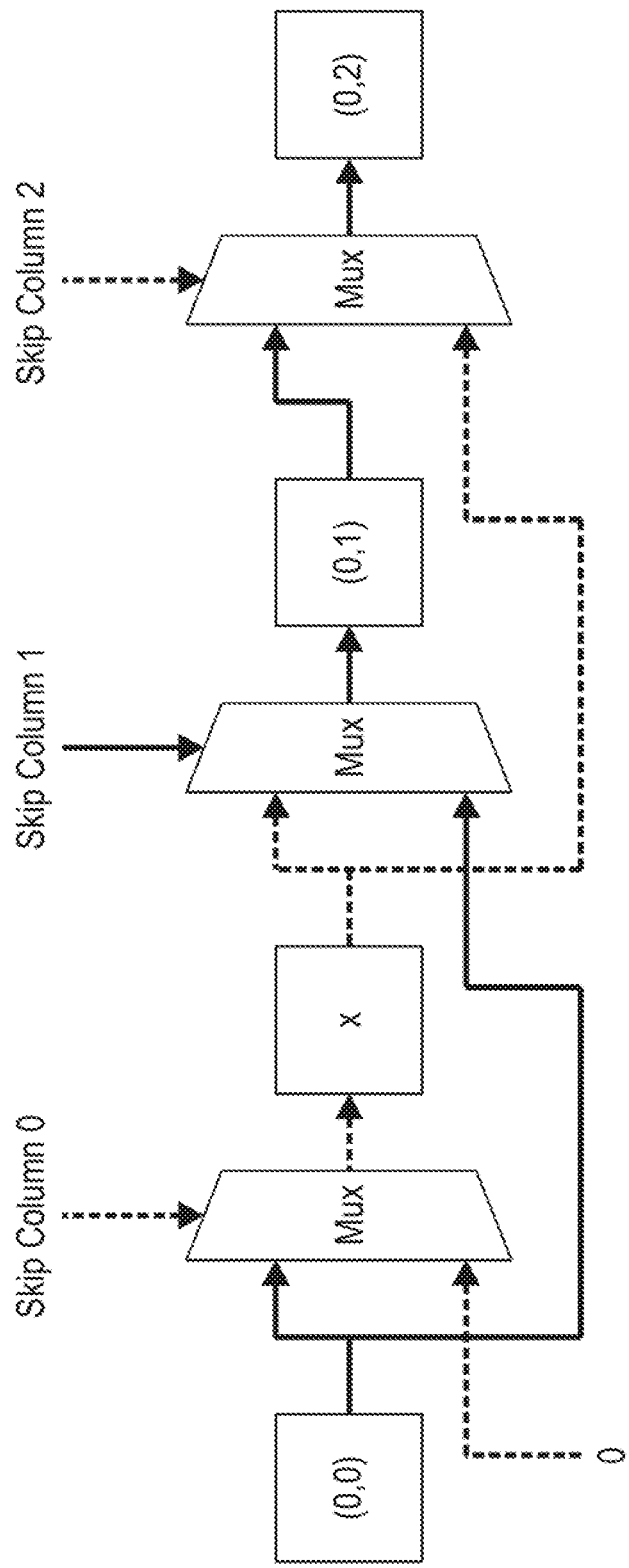
FIG. 8 is a hardware diagram illustrating the skipping of defective cores, according to embodiments of the present disclosure.

With reference now to FIG. 8, a hardware diagram is provided, illustrating an exemplary case in which defective cores are skipped by short-circuiting the communication channel between cores is disclosed. In some embodiments, defective cores are repaired by short-circuiting the output and input of properly functioning cores, and skipping a defective one. In the example illustrated in FIG. 8, the output of core (0,0) is connected to the input of core (0,1), thereby skipping the defective core show by X. The communication path shown from (0,0) to (0,1), and (0,1) to (0,2), uses three multiplexor gates. The core marked X is skipped by asserting skip column 1 signal. Although FIG. 8 only shows the communication path from left to right, a similar path can exist for the communication paths from right to left. Similarly, although the illustrated embodiment shows a circuit using multiplexor circuits, a number of circuit implementations can be performed employing the same short-circuiting. Since cores may need to communicate over a longer distance when there are defects, the chip performance may degrade relative to non-defective chips.

When a core is bypassed, wire length increases, resulting in reduced performance. To accommodate this reduction, the clock may be slowed down while maintaining chip functionality. The repaired chip may then be used in applications suitable for the reduced clock speed.

Figure 9:
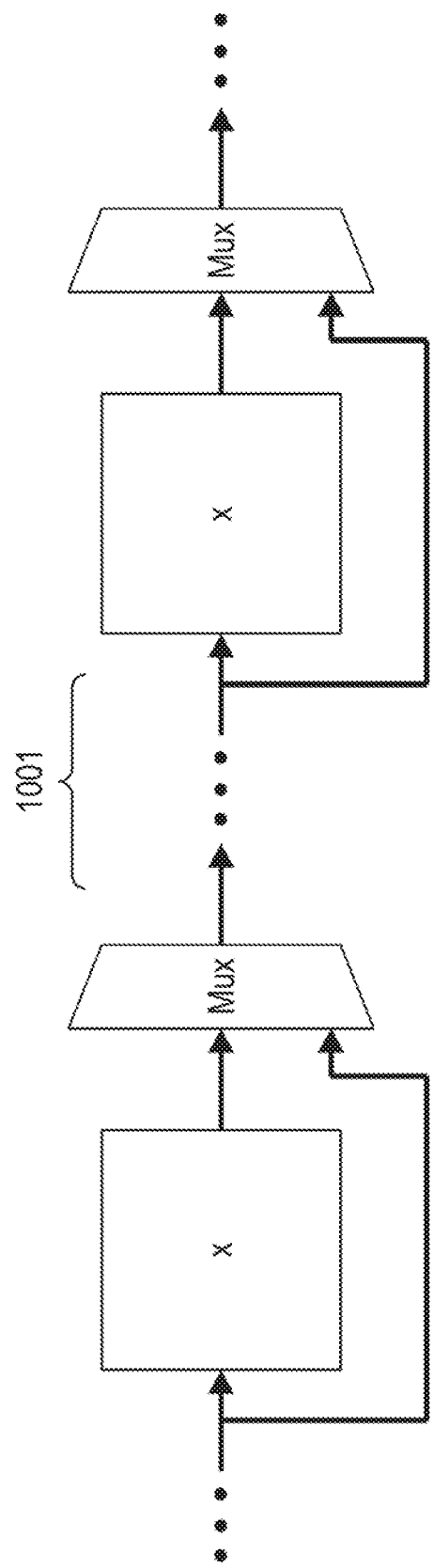
FIG. 9 is a hardware diagram illustrating the skipping of defective cores, according to embodiments of the present disclosure.

Referring to FIG. 9, an exemplary configuration of a core bypass is illustrated. In particular, to reduce the number of long core-to-core wires in a given embodiment, a circuit is provided at the receiver and the sender interface. In particular, a multiplexor merges the bypassed signal and the core's output before sending the resulting data along the long core-to-core wire 1001. In this way, the longer core-to-core wire (e.g., 1001) can be shared and need not be duplicated irrespective of whether a core is being bypassed.

Figure 10:
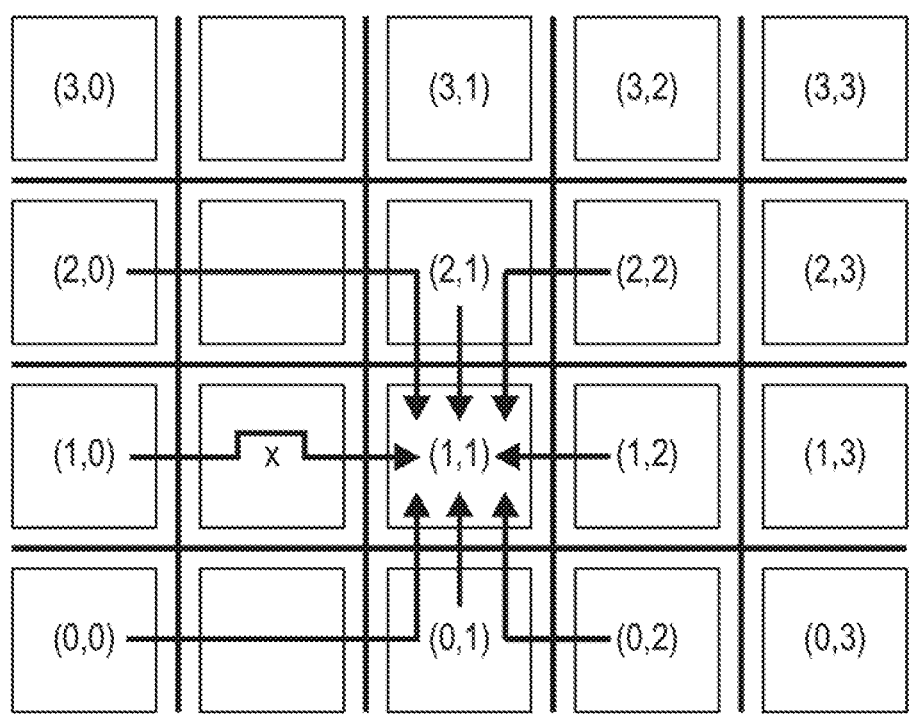
FIG. 10 depicts messages passing using a Network on Chip (NoC) that avoids cores affected by defects, according to embodiments of the present disclosure.

FIG. 10 depicts an exemplary embodiment in which messages are passed using a NoC that avoids cores affected by defects. In the embodiment illustrated, the NoC routes the packet by skipping the second column entirely. This example assumes east-west routing first and north-south routing second, though alternative routing is within the scope of the present disclosure. In a hopping network, the communication packet from (2,0) to (1,1) goes east, east, and then in the south directions. In non-defective case, the communication packet travels east, and south. The underlying network implementation can vary and include, e.g., relative addressing that does not increment/decrement the address on defective column. Additionally or alternatively, the network can convert the logical core address (x,y) to physical core address, and use the physical address to deliver the actual location. In the example depicted in FIG. 10, logical core (1,1) can be represented as (2,1).

Figure 11:
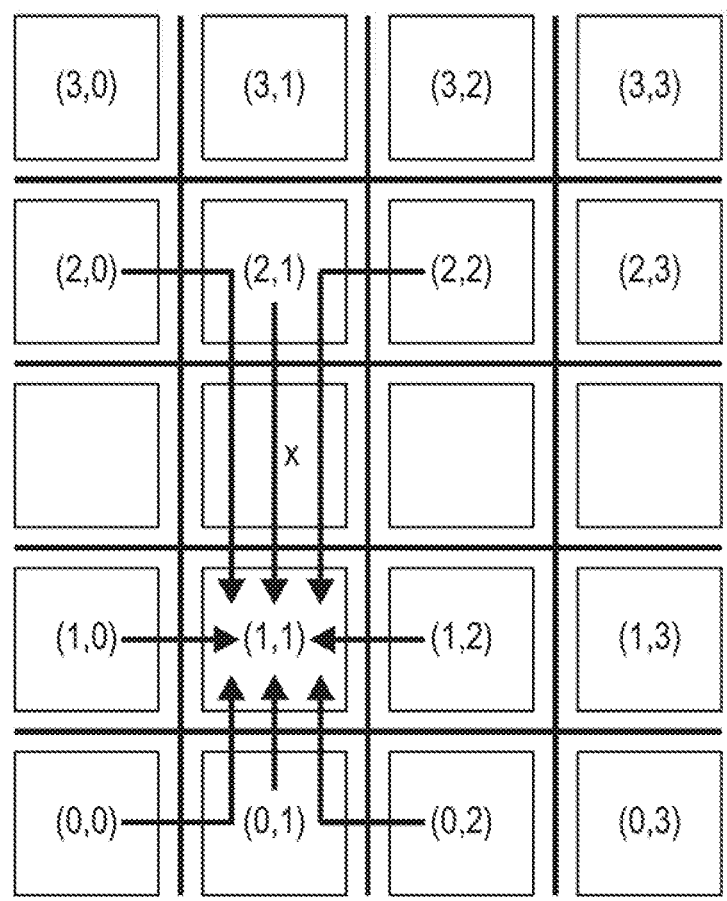
FIG. 11 depicts a process of skipping entire rows or columns using a NoC, according to embodiments of the present disclosure.

FIG. 11 depicts an exemplary embodiment in which an entire row is skipped (while FIG. 10 depicts skipping an entire column). By skipping the entire third row, the rest of the chip is not affected by the defects and thus can function with the normal placement with little impact on performance. While this technique is applicable to a plurality of rows or columns, the number of defective cores that can be hidden may be limited. For example, with a single extra row, there may not be a configuration that allows accommodation of two defective cores on different rows.

Figure 12:
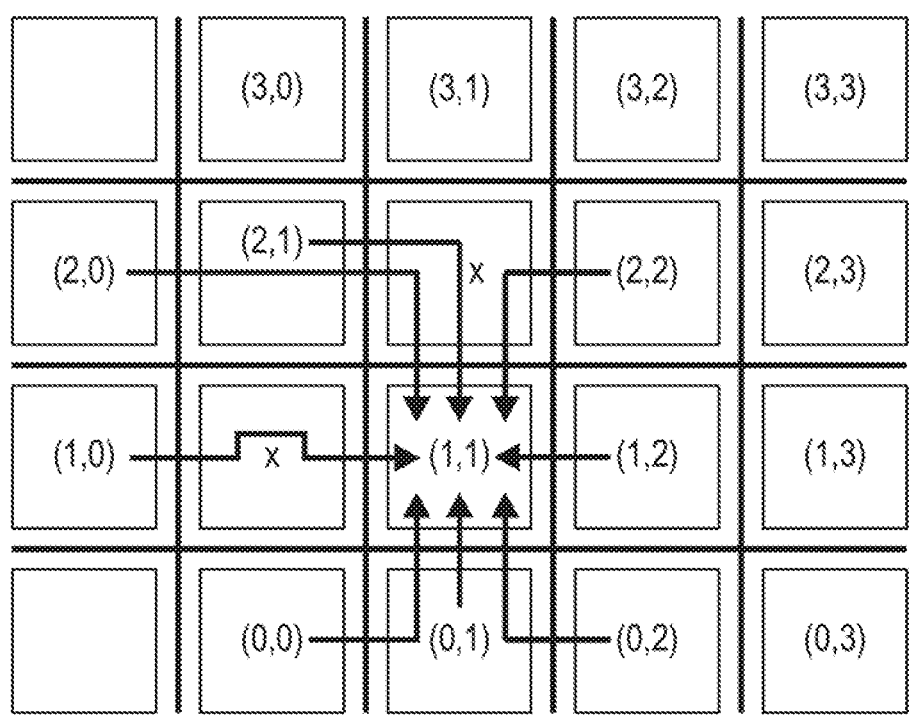
FIG. 12 depicts a process of skipping individual defective cores using a NoC, according to embodiments of the present disclosure.

FIG. 12 depicts an exemplary embodiment in which individual defective cores are avoided by the routing network, instead of entire column or rows. In this example, only defective cores are marked and cores are placed around the original location rather than removing entire columns or rows from an operation. In the example depicted, 2 cores are defective and marked X. We allocated core (1,0), (2,0) and (2,1) one hop left from the original location. The 3×3 network communication disclosed in FIG. 3 will collect partial sums using the NoC in a manner that avoids the defective cores as shown. In some embodiments, the entire core grid may be affected by a single defect, as the routing for all cores may be perturbed by a single defective core. Furthermore, performance may degrade as data is disorganized. This exemplary scheme is advantageous in that it can tolerate more defective cores, when those defective cores occur in different rows and columns.

Figure 13:
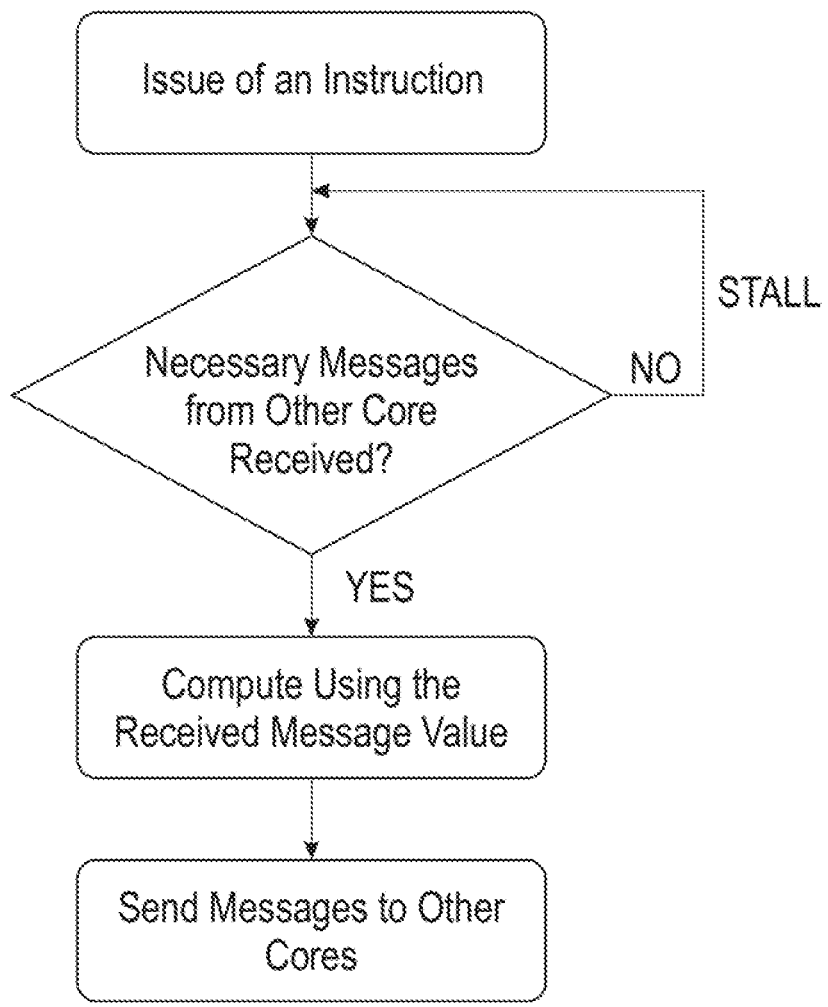
FIG. 13 depicts a process where a receiver core waits for delivery of a message by a Network on Chip (NoC) before starting computation, according to embodiments of the present disclosure.

FIG. 13 depicts an exemplary embodiment where receiver core waits for the delivery of the message by NoC before starting computation. In some embodiments, Network-on-chip may take longer to deliver core-to-core messages when cores are placed off from the original locations. Accordingly, by having a circuit that waits for the delivery of the core-to-core message, the program can be transparent to the physical core placement, and function normally even with defects. An exemplary control flow of each instruction is shown in FIG. 14, wherein performance may degrade a because of delayed messages.

Figure 14A:
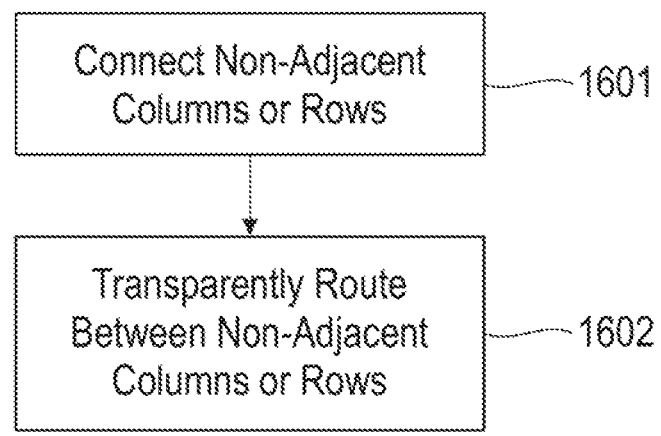
FIG. 14A-B illustrates a method for bypassing a defective core of a plurality of neural network processor cores, according to embodiments of the present disclosure.
Figure 14B:
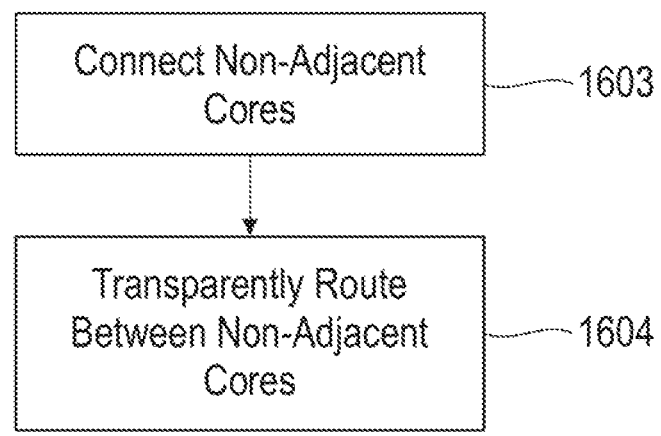

Referring to FIG. 14, a method of bypassing a defective core of a plurality of neural network processor cores are provided. The cores are arrayed in a grid. The grid has a plurality of rows and a plurality of columns. A network interconnects at least those of the plurality of neural network processor cores that are adjacent within the grid. At 1501, a connection is provided between two non-adjacent rows or columns of the grid. At 1502, messages are transparently routed between the two non-adjacent rows or columns, past the defective core. At 1503, a connection is provided between two non-adjacent cores. At 1504, messages are transparently routed between the two non-adjacent cores, past the defective core.

Figure 15:
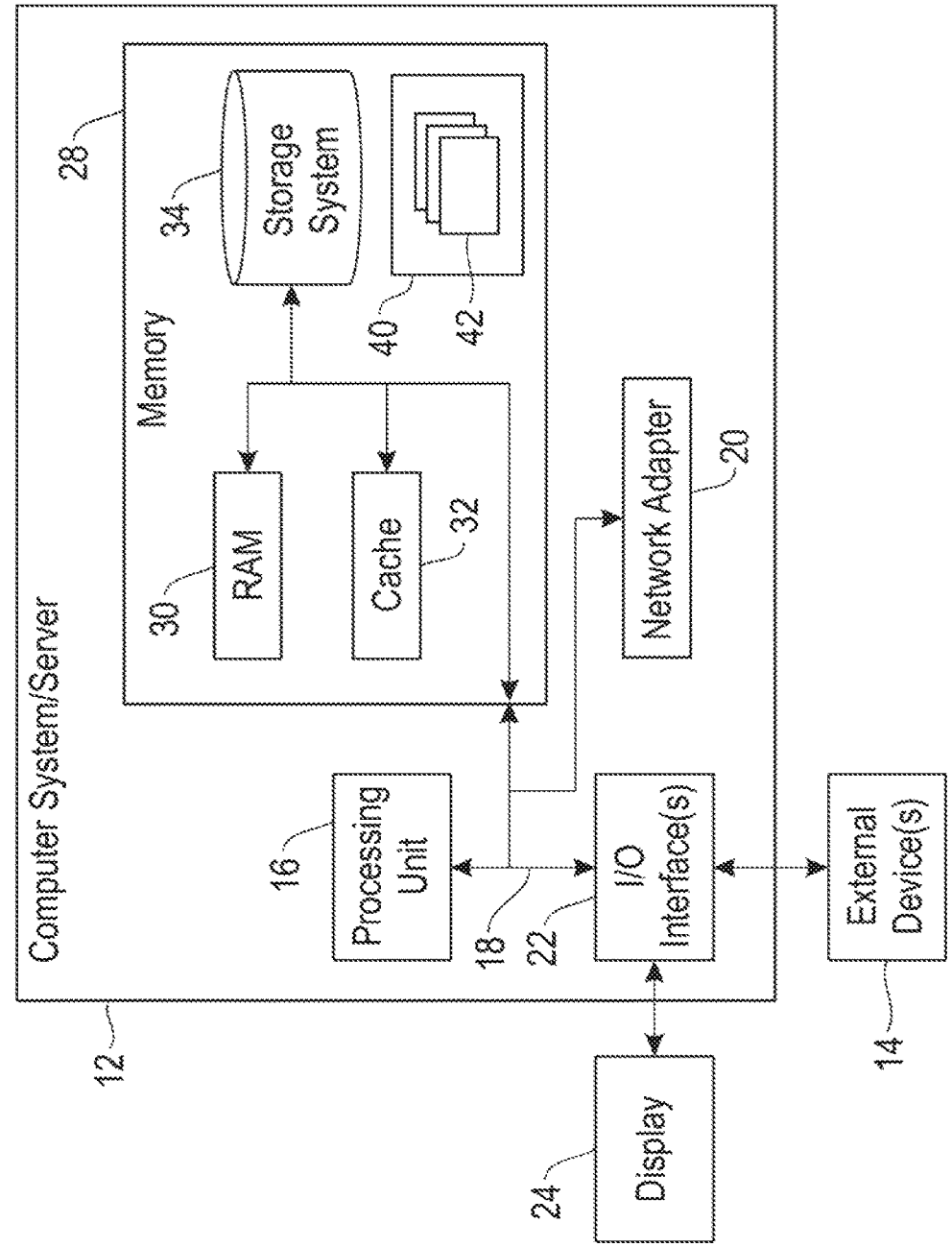
FIG. 15 depicts a computing node according to embodiments of the present disclosure.

Referring now to FIG. 15, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In various embodiments, one or more neurosynaptic core (not pictured) is coupled to bus 18. In such embodiments, a neurosynaptic core may receive data from or write data to memory 28 via bus 18. Likewise, a neurosynaptic core may interact with other components via bus 18 as described herein. In various embodiments, a neurosynaptic core may include one or more local controller, memory, or clock, for example as set forth elsewhere herein.

The present disclosure may include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a plurality of neural network processor cores arrayed in a grid, the grid having a plurality of rows and a plurality of columns; and
a network interconnecting at least those of the plurality of neural network processor cores that are adjacent within the grid, wherein:
the network comprises a switchable bypass between each adjacent core along each direction of two dimensions of the grid, each switchable bypass being directly connected, by a wire, to an input of one of the plurality of neural network processor cores and an output of that one of the plurality of neural network processor cores, and to an input of an adjacent one of the plurality of neural network processor cores, and
the network is adapted to bypass a defective core of the plurality of neural network processor cores by
applying the switchable bypass to provide a connection between two of the plurality of neural network processor cores in non-adjacent rows or columns of the grid, and
transparently routing messages between the two non-adjacent rows or columns, past the defective core, via the switchable bypass.

2. The system of claim 1, wherein:
the network comprises a loop connecting all cores within a row or column.

3. The system of claim 1, wherein:
the network comprises a loop connecting all cores within two adjacent rows or columns.

4. The system of claim 1, wherein the bypass comprises a multiplexor.

5. The system of claim 1, wherein the bypass precedes each core, and is adapted to select between an input from an adjacent core and a non-adjacent core.

6. The system of claim 1, wherein the bypass succeeds each core, and is adapted to select between an output of each core and of a preceding core.

7. The system of claim 6, wherein the bypass is connected to a succeeding core without any additional connection between the core and the succeeding core.

8. The system of claim 1, wherein the plurality of neural network processor cores are adapted to operate at a reduced clock frequency when bypassing a defective core.

9. The system of claim 1, wherein each of the plurality of neural network processor cores is identified by a physical address.

10. The system of claim 9, wherein the network is adapted to map a logical address to each of the cores, and wherein bypassing the defective core comprises remapping the logical addresses.

11. The system of claim 1, wherein the network is adapted to deliver message between cores, based on relative addresses.

12. A system comprising:
a plurality of neural network processor cores arrayed in a grid, the grid having a plurality of rows and a plurality of columns; and
a network interconnecting at least those of the plurality of neural network processor cores that are adjacent within the grid, wherein:
the network comprises a switchable bypass between each adjacent core along each direction of two dimensions of the grid, each switchable bypass being directly connected, by a wire, to an input of one of the plurality of neural network processor cores and an output of that one of the plurality of neural network processor cores, and to an input of an adjacent one of the plurality of neural network processor cores, and
the network is adapted to bypass a defective core of the plurality of neural network processor cores by
applying the switchable bypass to provide a connection between two of the plurality of neural network processor cores in non-adjacent cores, and
transparently routing messages between the two non-adjacent cores, past the defective core, via the switchable bypass.

13. The system of claim 12, wherein each of the plurality of neural network processor cores is identified by a physical address.

14. The system of claim 13, wherein the network is adapted to map a logical address to each of the cores, and wherein bypassing the defective core comprises remapping the logical addresses.

15. The system of claim 12, wherein the network is adapted to deliver message between cores, based on relative addresses.

16. A method of bypassing a defective core of a plurality of neural network processor cores, the cores being arrayed in a grid, the grid having a plurality of rows and a plurality of columns, a network interconnecting at least those of the plurality of neural network processor cores that are adjacent within the grid, wherein:
the network comprises a switchable bypass between each adjacent core, the method comprising:
directly connecting each switchable bypass, by a wire, to an input of one of the plurality of neural network processor cores and an output of that one of the plurality of neural network processor cores, and to an input of an adjacent one of the plurality of neural network processor cores;

applying the switchable bypass to provide a connection between two of the plurality of neural network processor cores in non-adjacent rows or columns of the grid along each direction of two dimensions of the grid; and transparently routing messages between the two non-adjacent rows or columns, past the defective core, via the switchable bypass.

17. The method of claim 16, wherein:
the network comprises a loop connecting all cores within a row or column.

18. The method of claim 16, wherein:
the network comprises a loop connecting all cores within two adjacent rows or columns.

19. The method of claim 16, wherein the bypass comprises a multiplexor.

20. The method of claim 16, wherein the bypass precedes each core, and is adapted to select between an input from an adjacent core and a non-adjacent core.

21. The method of claim 16, wherein the bypass succeeds each core, and is adapted to select between an output of each core and of a preceding core.

22. The method of claim 21, wherein the bypass is connected to a succeeding core without any additional connection between the core and the succeeding core.

23. A method of bypassing a defective core of a plurality of neural network processor cores, the cores being arrayed in a grid, the grid having a plurality of rows and a plurality of columns, a network interconnecting at least those of the plurality of neural network processor cores that are adjacent within the grid, wherein:

the network comprises a switchable bypass between each adjacent core, the method comprising:

directly connecting each switchable bypass, by a wire, to an input of one of the plurality of neural network processor cores and an output of that one of the plurality of neural network processor cores, and to an input of an adjacent one of the plurality of neural network processor cores;

applying the switchable bypass to provide a connection between two non-adjacent cores along each direction of two dimensions of the grid; and transparently routing messages between the two non-adjacent cores, past the defective core, via the switchable bypass.

* * * * *